Dec. 28, 1954  O. E. COTE ET AL  2,697,968
MACHINE FOR MAKING SET UP BOXES
Filed March 8, 1952  10 Sheets-Sheet 1
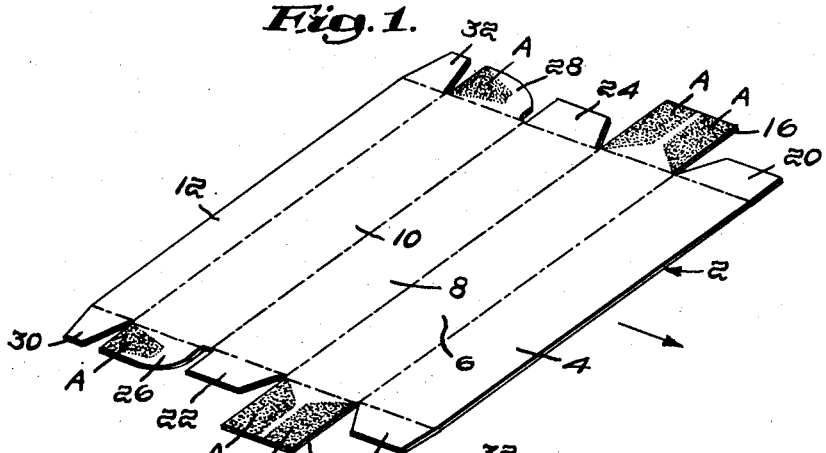
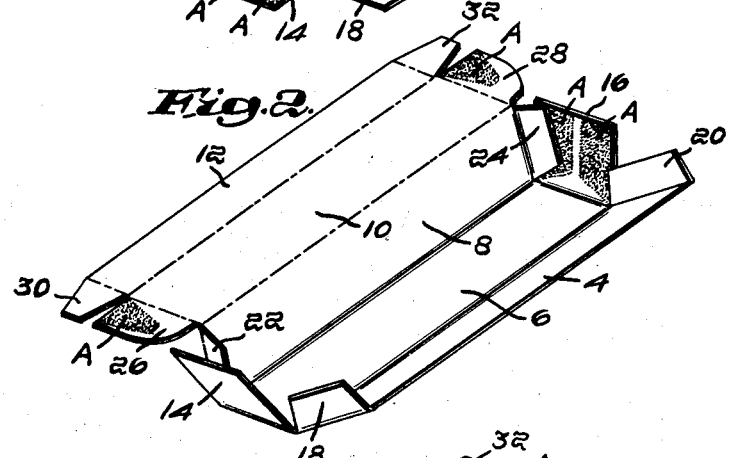
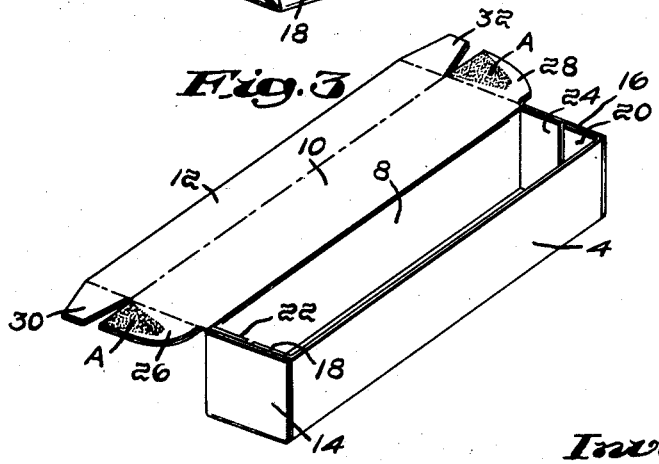
Inventors:
Omer E. Cote,
George H. Nilsen,
by C. Yardley Chittick
Attorney Dec. 28, 1954     O. E. COTE ET AL     2,697,968
MACHINE FOR MAKING SET UP BOXES
Filed March 8, 1952     10 Sheets-Sheet 2
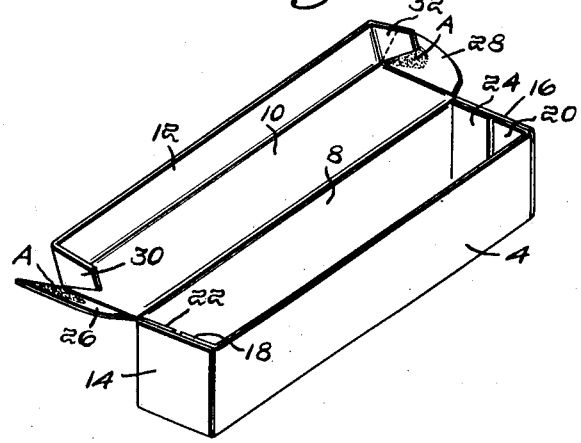
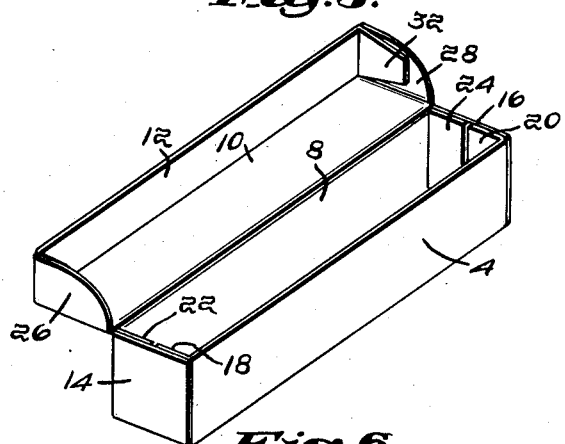
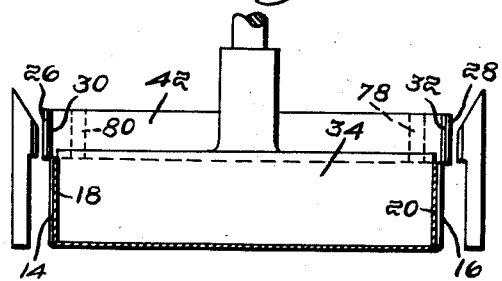
Inventors:
Omer E. Cote,
George H. Nilsen,
by Chandler Chittick
Attorney

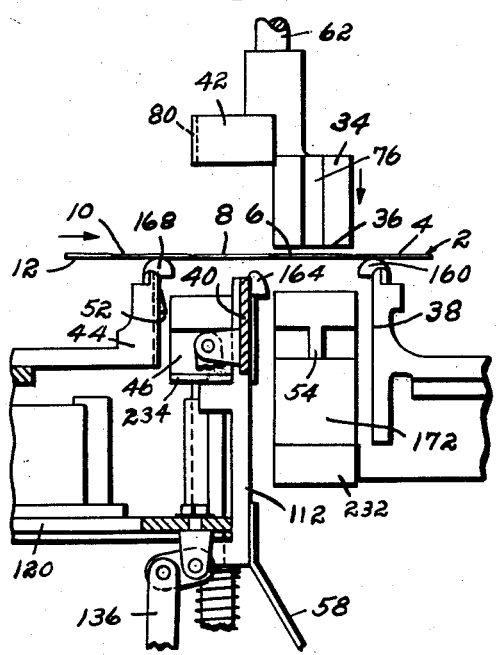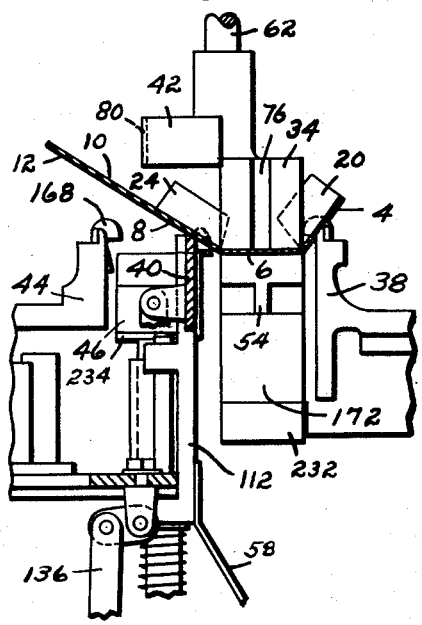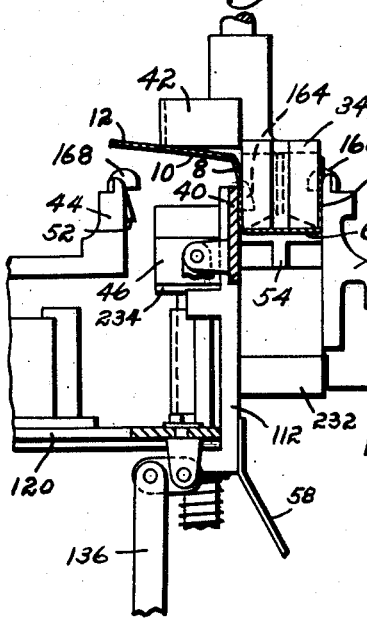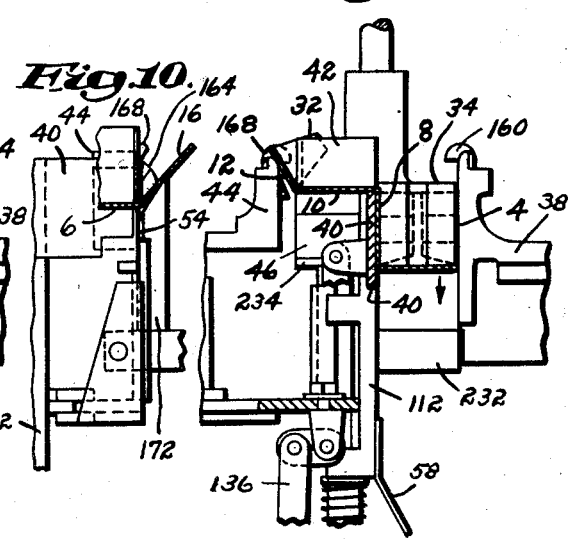

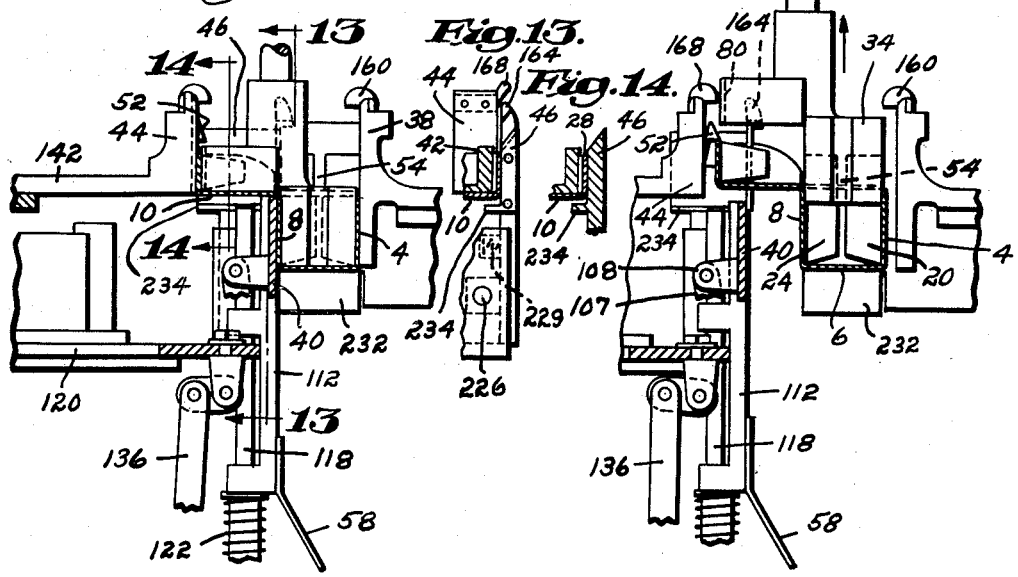

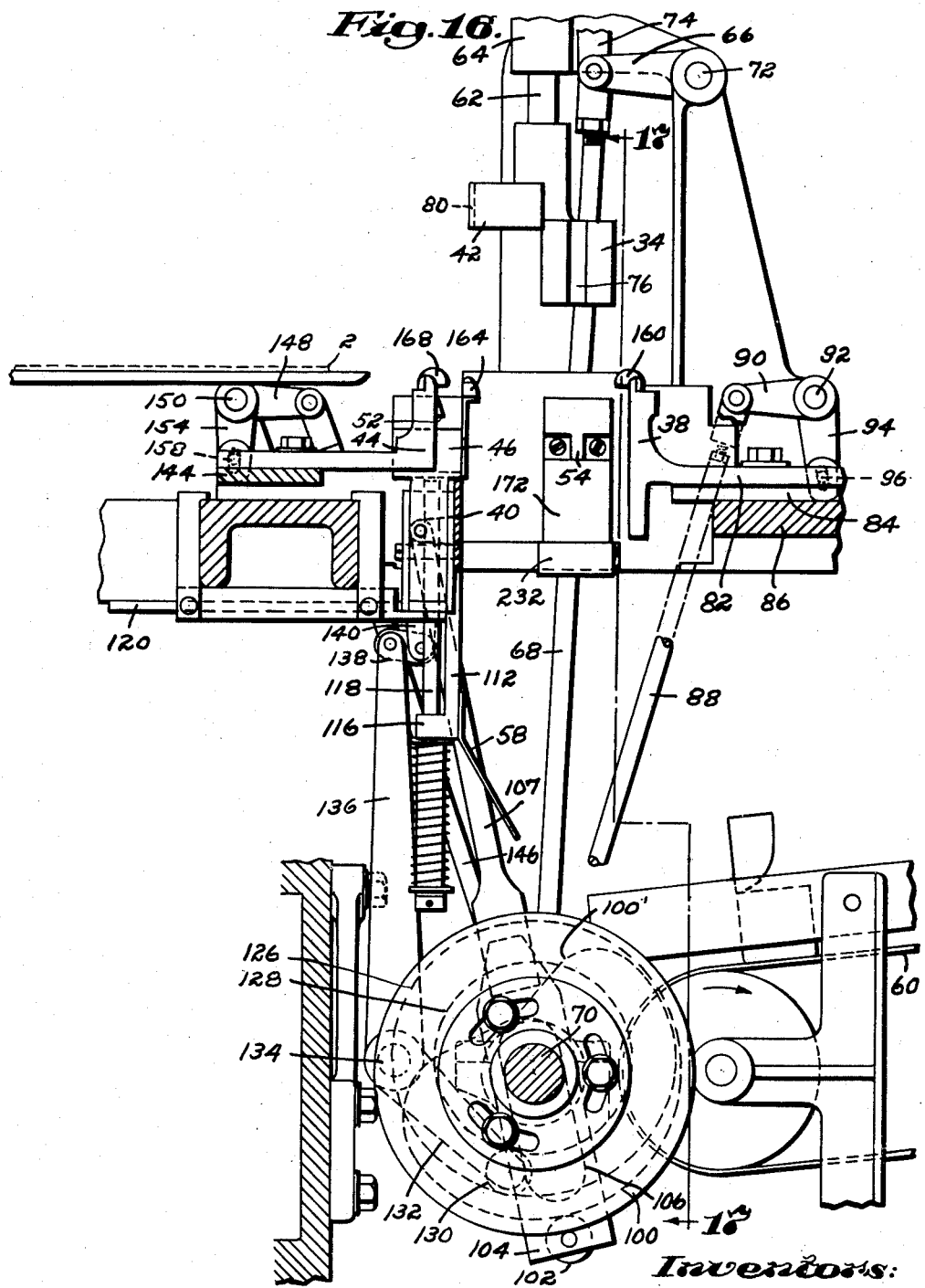

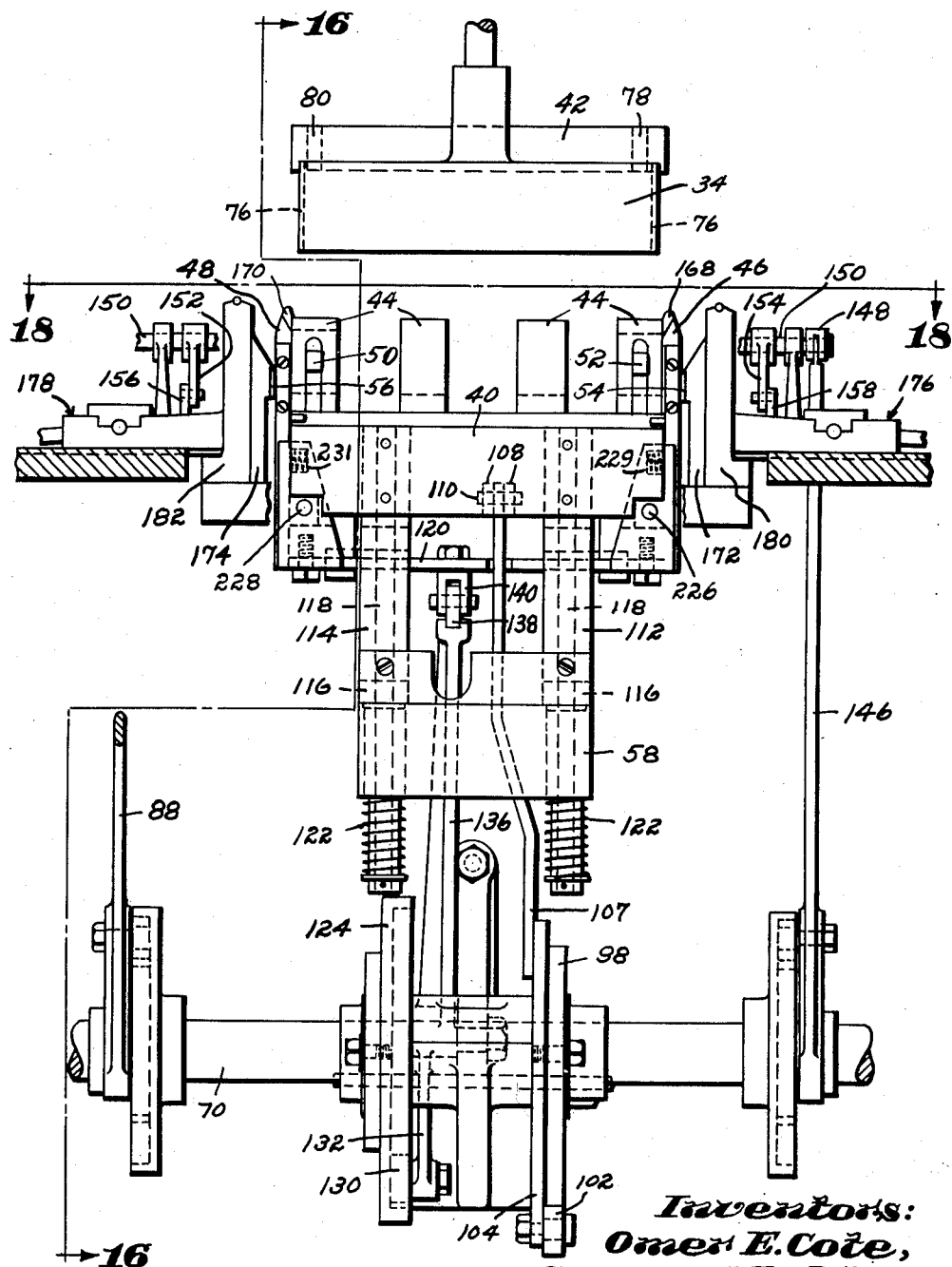

Dec. 28, 1954     O. E. COTE ET AL     2,697,968
MACHINE FOR MAKING SET UP BOXES
Filed March 8, 1952     10 Sheets-Sheet 7
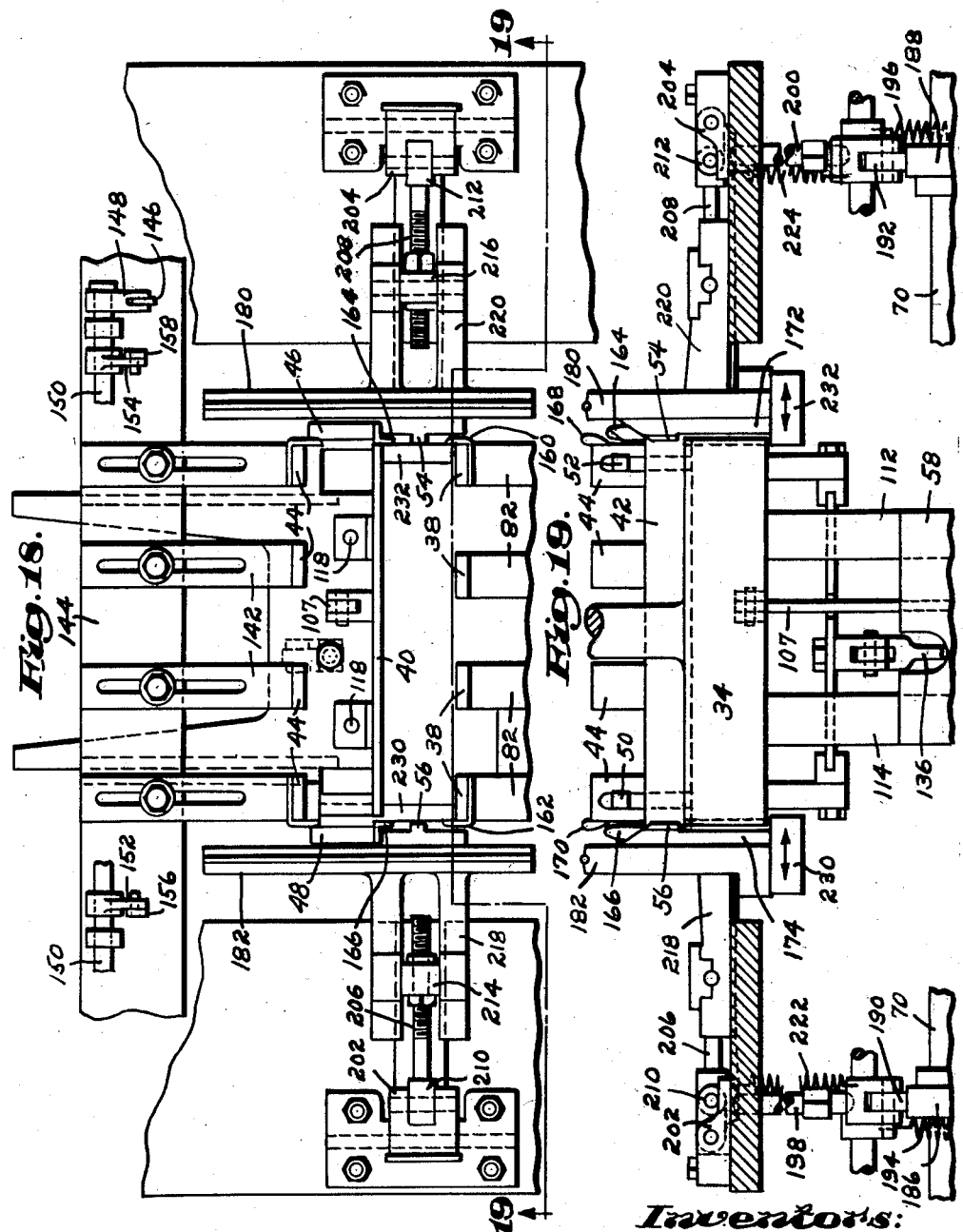

Dec. 28, 1954     O. E. COTE ET AL     2,697,968
MACHINE FOR MAKING SET UP BOXES
Filed March 8, 1952     10 Sheets-Sheet 8
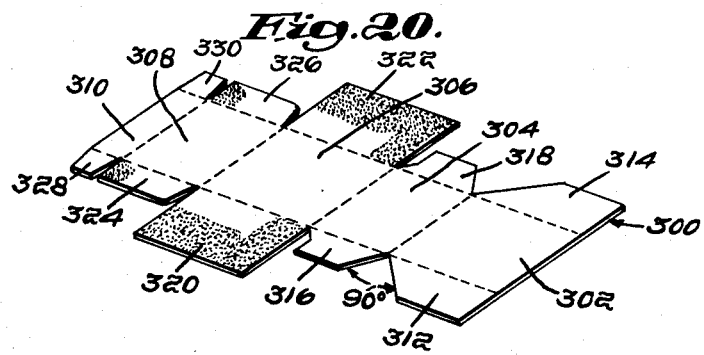
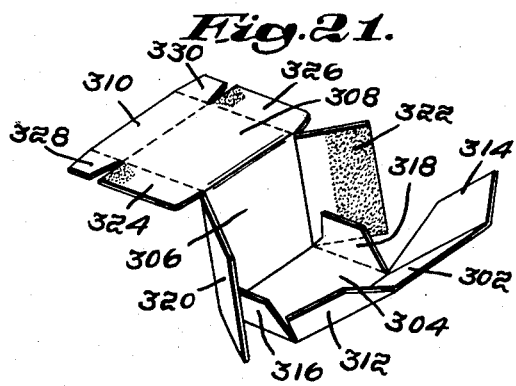
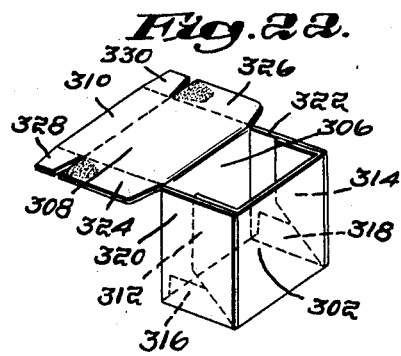
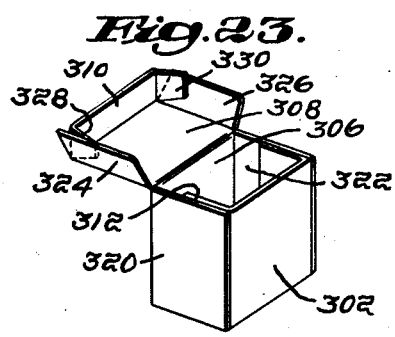
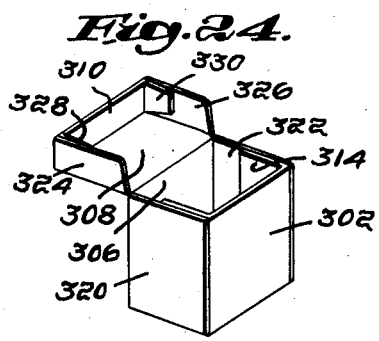
Inventors:
Omer E. Cote,
George H. Nilsen,
by Chardley Chittick
Attorney Dec. 28, 1954  O. E. COTE ET AL  2,697,968
MACHINE FOR MAKING SET UP BOXES
Filed March 8, 1952  10 Sheets-Sheet 9

Inventors:
Omer E. Cote,
George H. Nilsen,
by Cyardley Chittick
Attorney

Dec. 28, 1954   O. E. COTE ET AL   2,697,968
MACHINE FOR MAKING SET UP BOXES
Filed March 8, 1952   10 Sheets-Sheet 10
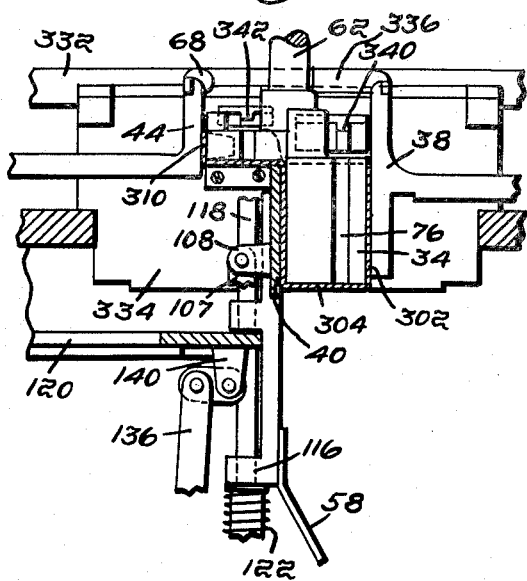
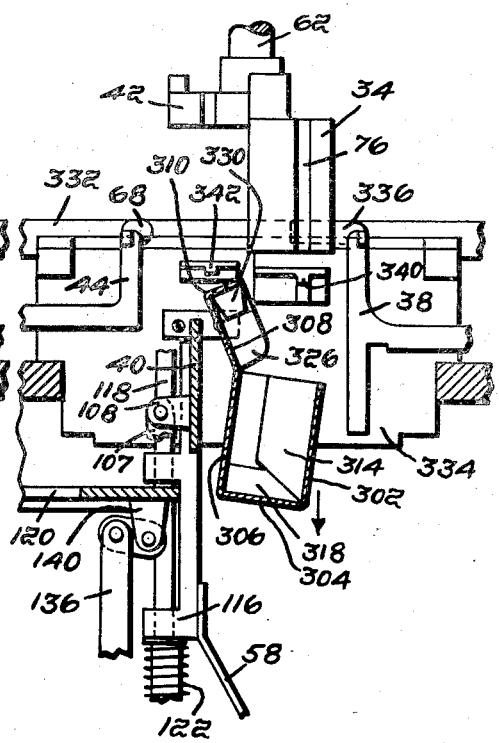
Inventors:
Omer E. Cote,
George H. Nilsen,
by Yardley Chittick
Attorney United States Patent Office 2,697,968
Patented Dec. 28, 1954

2,697,968

MACHINE FOR MAKING SET UP BOXES

Omer E. Cote, Providence, R. I., and George H. Nilsen, Waltham, Mass., assignors to United States Automatic Box Machinery Co., Inc., Boston, Mass., a corporation of Massachusetts Application March 8, 1952, Serial No. 275,504

20 Claims. (Cl. 93—51)

This invention relates to a machine for making a set-up box. This application is a continuation-in-part of our application Ser. No. 249,196, filed October 1, 1951, for Method of and Machine for Making a Set-Up Box, now abandoned.

Machines that are now commonly in use for producing set-up boxes are capable of forming the body of the box but cannot fold and secure those additional elements that are related to the lid. These additional lid elements, such as the front flap and ends, have heretofore been assembled to proper position by hand after the box has left the machine. That is to say, there is at the present time, so far as we know no machine on the market capable of producing a completely formed set-up box of the type that is now widely used in the sale of wax paper, aluminum foil, Pliofilm and cereals. Boxes of this type have a body portion consisting of a bottom, front, back, ends and a lid. This lid has, in addition, a front flap that overlies the front of the body, and end portions continuous with the front flap and lid which overlie a portion of the body ends when the box is closed.

It is an object of this invention to provide, first, a new and novel method for producing a six point set-up box and, secondly, a machine capable of producing such a box. A six point set-up box is so called because there are six positions in the box which must be glued or otherwise secured to maintain it in the required finished condition.

These and other objects of the invention will become more apparent as the description proceeds with the aid of the accompanying drawings in which:

Fig. 1 is a plan perspective of the blank that is to be formed into the six point box.

Fig. 2 shows the condition of the blank after the body has been partially formed.

Fig. 3 shows the condition of the blank after the body of the box has been completely formed but before any forming of the lid has occurred.

Fig. 4 shows the lid partially formed.

Fig. 5 shows the entire box in its completed condition with the lid open.

Fig. 6 is a front view of the plunger with the completed box folded thereabout, the front of the body of the box having been removed thus showing the ends and bottom in section.

Figs. 7 to 15 show the series of machine operations that produce the box in the various steps that substantially corresponds with Figs. 1 to 5.

Fig. 16 is a vertical section showing a general view of the box forming mechanism including the actuating cams. This view is approximately on the line 16—16 of Fig. 17.

Fig. 17 is a view looking from the right of Fig. 16 with some of the mechanism of Fig. 16 omitted. This view is approximately on the line 17—17 of Fig. 16.

Fig. 18 is a plan view of the folding mechanism taken approximately on the line 18—18 of Fig. 17.

Fig. 19 is an enlarged view similar to a portion of Fig. 17 showing details of the toggle mechanism that actuates the end pressure mechanism. In this view the plunger is in down position.

Fig. 20 is a plan perspective of a modified type of blank that may be formed into a six point box according to the invention.

Fig. 21 shows the condition of the blank after the body of the blank, shown in Fig. 20, has been partially folded.

Fig. 22 shows the condition of the blank of Fig. 20 after the body of the box has been completely formed but before any forming of the lid has occurred.

Fig. 23 shows the box of Fig. 22 with the lid partially formed.

Fig. 24 shows the box of Fig. 23 in its completed condition with the lid open.

Figs. 25 to 30 show the box forming machine in a series of successive steps in which the box blank of Fig. 20 is brought to the finished condition shown in Fig. 24. This group of figures corresponds in general to the series of steps shown in Figs. 7 to 15.

Figure 25:
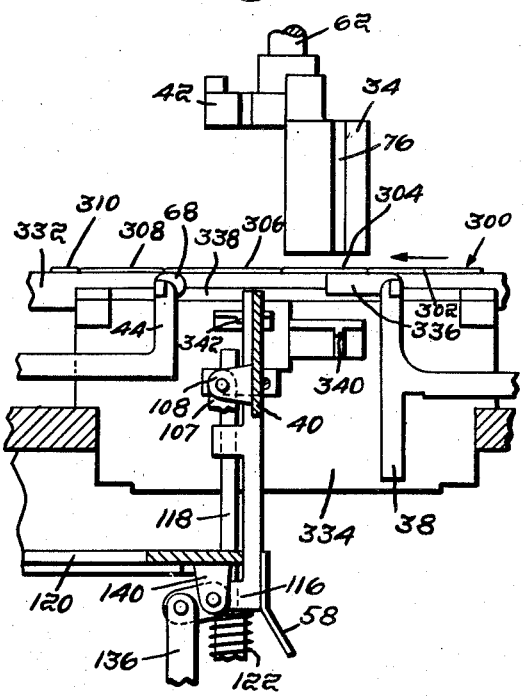

Referring to Figs. 1 to 5, the blank from which the six point box is to be made is indicated generally at 2. The particular dimensions of the various parts of the box may be varied at will to accommodate goods of varying sizes but the blank will in all cases retain the same number of elements which will be folded in the same manner to produce the same type of finished box. The blank 2 in its flat unfolded form has first been scored along transverse and longitudinal lines to produce a front 4, a bottom 6, a back 8, a lid 10 and a flap 12. To these various portions are affixed the following elements. Extending from both ends of the bottom 6 are the ends 14 and 16, and from front 4 and back 8 extend tabs 18, 20, 22 and 24. The lid 10 has two end portions 26 and 28 extending therefrom and the flap 12 has corresponding end flaps 30 and 32.

Prior to the blank reaching the forming position, it has first passed under a conventional gluing mechanism which applies a limited quantity of adhesive to the ends 14, 16, 26 and 28, as indicated at the several places marked A.

The blank is fed horizontally in the direction of the arrow in Fig. 1 until it reaches the forming position. At this point, the various elements of the machine cooperate to drive the bottom 6 downwardly as in Fig. 2 while at the same time folding upwardly the front 4, the back 8, the ends 14 and 16, and simultaneously the tabs 18, 20, 22 and 24 are folded inwardly enough to be inside of the ends 14 and 16. The operation then advances further as shown in Fig. 3, in which the body of the box is squared up and the ends are pressed against the tabs to cause the glue to adhere. The procedure up to this point is conventional in that automatic set-up box machinery that has been available heretofore and which is now in use will assemble a box to the extent shown in Fig. 3. The present invention, however, as pointed out above includes the method of the additional steps shown in Figs. 4 and 5 and the machinery that is capable of carrying out these additional steps.

Thus, in Fig. 4 it will be seen that the folding operation is continued with respect to the lid so that flap 12 is folded upwardly along with ends 26 and 28 while tabs 30 and 32 are simultaneously turned in enough to be inside of the ends.

The parts finally reach the condition shown in Fig. 5 in which flap 12 has been brought to a position at right angles to lid 10 and the ends 26 and 28 have been secured by the adhesive A to their respective tabs. The box as shown in Fig. 5 is then complete as far as its assembly is concerned. Of course, when the box has been filled later with merchandise, the lid will be swung over to the right to close the box in the usual manner. The box in the form of Fig. 5 is then caused to fall from the folding mechanism to be received by a conveyor, or otherwise removed from the machine.

From the foregoing it can be seen that the method of folding a six point box of the type described comprises the steps of applying adhesive to the ends of the box and ends of the lid at locations against which the appropriate tabs will subsequently be pressed and then, first folding the body portion of the box while holding the lid and lid flap in a substantially horizontal position and unfolded condition and finally, after the completion of the assembly of the body of the box, folding the lid elements while the lid is itself being maintained in a horizontal position.

The mechanism for carrying out the method aforesaid will now be briefly described. Referring generally to Figs. 7 to 15, all of which are in elevation and partly in section, it can be seen in Fig. 7 that the blank 2 which is fed to this position from the left comes to a halt under the plunger 34. The plunger then descends with the bottom 36 engaging the bottom 6 of the blank to force it downwardly as illustrated in Fig. 8, thus commencing the upward bending of the front 4 and the back 8, which bending is caused by the engagement of the undersides of the front and back with the folders 38 and 40.

In Fig. 9 the plunger 34 has descended further and the folders 38 and 40 have moved toward each other to bring the front 4 and the back 8 to vertical position and at the same time the lid 10 and flap 12 are held in generally horizontal position by engagement with the rear extension 42 of plunger 34. This rear extension is the form about which the lid is subsequently folded to bring about the completion of the box.

Fig. 10 is a front view showing the manner in which the end 16 is being folded to vertical position while the other portions of the box are in substantially the position shown in Fig. 8.

In Fig. 11 the plunger including the rear extension 42 has moved down still further and the folder 44 has come into play to fold the flap 12 upwardly part way to its completed position. In the next view, Fig. 12, the folder 44 has moved to the right to force the flap 12 to vertical position and at the same time the end folder points have brought the ends 26 and 28 and tabs 30 and 32 to vertical position so that they may be pressed together by the pressers 46 and 48. See Figs. 17 and 18.

Fig. 13 is taken on the line 13—13 of Fig. 12, showing the folded end of the cover, and Fig. 14 is a section taken on the line 14—14 of Fig. 12 also showing a section of the folded end of the cover.

The box, when the mechanism has reached the position shown in Fig. 15, has been completely folded and glued, after which the plunger 34 is withdrawn vertically leaving the box behind as the shedders hold the box from moving upwardly with the plunger. There are four shedders, two designed to engage the flap of the box and indicated at 50 and 52 in Fig. 17, and two designed to engage the ends of the box and shown at 54 and 56 in Figs. 17, 18 and 19. As soon as the plunger 34 is free of the box, the folders and pressers back away so that the box can then fall downwardly of its own weight and is deflected to the right by the deflector 58 to fall on a conveyor belt 60 to be carried away to a collection point. The foregoing constitutes a brief general description of the operation of that portion of the set-up box machine which constitutes the inventive elements of the mechanism and which will now be described in greater detail.

*Plunger*

The plunger 34, as shown in Fig. 16, is operated by vertical oscillation of its supporting cylindrical shaft 62 which is arranged for vertical oscillation in a suitable bearing 64, the said shaft being actuated by reciprocation of crank arm 66 that is actuated by rod 68 driven by a suitable cam, not shown, on the main cam shaft 70. Movement of crank arm 66 operates shaft 72 which has a similar crank arm on its other end that actuates link 74, the upper end of which is connected with shaft 62. All of this structure is conventional and is commonly used in set-up box machines of this general type. The cam on cam shaft 70 that actuates rod 68 is timed with the other elements so that the descent and ascent of plunger 34 fit in with all of the other motions. On both end faces of plunger 34 are vertical grooves 76 which receive the shedders 54 and 56 when the end pressers have moved to their most inwardly positions. In the rear of extension 42 are two vertical grooves 78 and 80 in which are positioned the shedders 50 and 52 when the rear folder 44 has moved to maximum forward position. These grooves permit the plunger 34 to move up while the shedders 50, 52, 54 and 56 overlie the top edges of the lid flap and the top edges of the ends to cause stripping of the box from the plunger. See Fig. 15.

*Folders*

In order that the front 4 and back 8 of the box may be folded to vertical position as indicated in Figs. 2 and 3, there are provided folder elements 38 and 40 which have already been referred to in connection with the discussion of Figs. 7 to 15. The folder 38 comprises a plurality of vertical plates which can be seen in plan in Fig. 18 and in side elevation in Fig. 16. These plates have horizontal rear extensions 82 which are bolted to a transverse plate 84 which plate is slidable transversely with respect to a fixed back plate 86, shown in Fig. 16. The folders 38 are caused to move forward and back in suitable timed relation with respect to the other elements by means of a cam actuated rod 88, the cam of which is shown in Fig. 17 mounted on the left end of cam shaft 70. As rod 88 reciprocates longitudinally, it oscillates crank arm 90, shaft 92 and crank arm 94, the lower end of which is connected with a stud 96 affixed to plate 84. Shaft 92 extends transversely of the machine and has on the other side a second arm similar to 94 which connects with another stud similar to 96 so that the force applied to plate 84 is applied simultaneously at spaced positions, causing the plate 84 to move back and forth in parallelism and in turn moving the folders 38 toward plunger 34 when the latter has descended a distance sufficient to commence the folding of front 4 and back 8. The folder 38 just described is the folder that causes the front 4 to assume a final vertical position that is indicated in Fig. 3.

The folder 40 is the folder which causes the back 8 to assume its vertical position parallel to front 4. Folder 40 comprises a vertical transverse flat plate which has extensive substantial longitudinal forward and backward movement as well as downward movement which occurs during the last part of the downward stroke of plunger 34. In order that the completed box, as shown in Fig. 5, may drop out of the machine it is necessary for folder 40 to be withdrawn to the left a distance sufficient to clear the lid. In addition, after folder 40 has brought back 8 to vertical position, it must be arranged to move downwardly along with the box as the plunger 34 descends further and the folding operations that are applied thereafter to the flap 12 of the lid and the corresponding end elements are being performed. With this in mind the mechanism that actuates folder 40 will now be described.

In Figs. 16 and 17 it can be seen that there is a cam 98 mounted on cam shaft 70 having its outer surface indicated by the dotted line 100 in Fig. 16. Against this surface rides a follower 102 mounted on the lower end of a plate 104 having a longitudinal slot 106 which straddles cam shaft 70. The upper end of plate 104 is connected to a bar 107 which in turn at its upper end is connected by suitable lugs 108 and pin 110 to the rear of folder 40. Folder 40 is further supported by two vertical members 112 and 114, the lower ends of which are turned to form extensions 116. These extensions are vertically bored and through the bores extend vertical rods 118, the upper ends of which are fixed to the front end of slide 120. The lower ends of rods 118 extend a substantial distance below extensions 116 and carry compression springs 122 which serve to urge bars 112 and 114 upwardly, thus maintaining folder 40 in maximum up position except as the springs 122 may become compressed. Springs 122 serve to hold follower 102 firmly against the lower surface of cam 98 as it revolves.

It can, therefore, be seen that, as cam shaft 70 rotates, when the follower 102 engages the depressed part of the cam surface, indicated at 100', the springs 122 may and will expand to cause folder 40 to move upwardly and thereafter as the cam rotates further follower 102 will be moved down drawing plate 40 downwardly. Thus, cam 98 provides for the vertical component of the movement of folder 40, all in timed relation with the other elements.

The horizontal component of movement of folder 40 is provided by the operation of cam 124. This cam has an internal track, the sides of which are indicated in Fig. 16 by 126 and 128. In this cam track is a roller follower 130 connected to the end of crank arm 132 which is pivoted at 134 and has an upwardly extending crank arm 136, the top end of which is connected by a link 138 to a stud 140 affixed to the bottom of slide 120. From the foregoing it will be seen that as cam 124 rotates, the crank arm 132 will be swung through an arc which in turn will swing arm 136 back and forth to move slide 120 a corresponding distance back and forth. As the rods 118 on which the members 112 and 114 slide are secured to slide 120, folder 40 moves horizontally with slide 120.

In the foregoing manner, horizontal and vertical motion is imparted to folder 40 as cam shaft 70 rotates. The general path of folder 40 is upwardly and inwardly toward plunger 34, then downwardly with plunger 34 and finally outwardly to an amount sufficient to clear the lid of the box at the completion of the folding operation. The sequence of positions of folder 40 can be seen in Figs. 7 to 15.

The third folder 44 is caused to function in timed relation with all of the other elements to cause the vertical folding of flap 12, bringing it from the horizontal position of Figs. 1, 2 and 3 to the vertical positions shown in Figs. 4 and 5. Folder 44 is in general similar to folder 38 in that it consists of a plurality of vertical plates, each of which is adjustably secured by a horizontal member 142 to transverse plate 144. Transverse plate 144 is caused to slide back and forth in the same manner as plate 84. The mechanism for accomplishing this is shown in Figs. 16, 17 and 18 and comprises a cam operated rod 146 which on reciprocating oscillates lever 148 and shaft 150 to which it is attached. On shaft 150 are two other levers 152 and 154 which are in engagement with lugs 156 and 158 that are attached to plate 144. Thus, as cam shaft 70 rotates, rod 146 reciprocates in the same manner as rod 88, and plate 144 and the attached folders 44 move toward and away from plunger 34.

Again all of the motions of the various folders will be understood to occur at the proper times in relation to the downward movement of plunger 34 so that in the first part of the plunger movement, front 4 and back 8 of the body of the box will be folded to vertical position by folders 38 and 40 and subsequently, as downward motion of plunger 34 continues, the flap 12 connected to lid 10 will be folded to its proper vertical position as shown in Fig. 5.

*Folder points*

In the foregoing description the discussion centered on the folding of the front, back and flap of the box and no mention was made of the mechanism utilized to fold up the ends 14 and 16 of the box against the tabs 18, 20, 22 and 24 and the ends of the lid 26 and 28 against corresponding tabs 30 and 32. The folding of these portions of the blank are accomplished by conventional mechanism known in machines of this type as folder points. These folder points are specially shaped elements affixed to the outer ends of the folders and which are so positioned that as the blank is depressed by the descending plunger 34, the tabs will be immediately engaged by the folder points to fold them in a distance great enough so that when the ends of the box 14, 16, 26 and 28 come into engagement with the end pressure elements to commence being folded, the tabs will of necessity find themselves inside of the ends, the result being that as the plunger continues its descent and the folders come in from the sides to press against the plunger and the end pressure elements come in against the ends of the box, the tabs will be located interiorly of the ends and will be secured in proper position by the adhesive previously applied to the upper surfaces of the ends while the blank was in flat condition, as indicated in Fig. 1.

The folder points that are associated with folder 38 are numbered 160 and 162, the folder points associated with folder 40 are numbered 164 and 166, and the folder points associated with folder 44 are numbered 168 and 170. The folder points 164 and 166 that function in conjunction with folder 40 are connected with slide 120 to move in a horizontal plane according to the horizontal motion of folder 40 but they do not move vertically with folder 40. Instead, they maintain a fixed vertical position the same as folder points 160, 162, 168 and 170.

Further description of the character of the folding points is believed unnecessary because of their common and well-known use in the set-up box machinery field. Suffice it to say that they are in the nature of ears having an upward, outward sloping surface and so located in a vertical plane as to engage the corresponding tabs to commence the inward folding thereof before there has been any corresponding folding of the box ends.

*End pressure mechanism*

After the box has been folded to its completed rectangular position, as indicated in Fig. 5, it is apparent that pressure must be brought against the ends 14, 16, 26 and 28 if the adhesive thereon is to become firmly affixed to the tabs 18, 20, 22, 24, 30 and 32. The mechanism that applies the necessary end pressure after the box has been folded will now be described.

In general, the mechanism comprises end pressure plates 172 and 174 which are caused to move toward and away from the plunger at suitable times by toggle mechanisms generally indicated in the figures at 176 and 178. The end pressure plates are supported by the backing plates 180 and 182 which are affixed to the toggle mechanisms. The toggle elements are best shown in Figs. 18 and 19 in which it will be seen that the previously referred to cam shaft 70 has on opposite ends thereof cams 186 and 188 on which ride followers 190 and 192. These followers are urged in downward position against the cams by tension springs 194 and 196. The vertically extending bars 198 and 200 are positioned between sockets in forks carried by the followers 190 and 192 and sockets on the under side of the short levers 202 and 204. Adjustable links 206 and 208 are secured by eyes 210 and 212 between the legs of levers 202 and 204. The threaded ends of links 206 and 208 are adjustably carried by crossbars 214 and 216 which in turn are pivotally mounted on the extensions 218 and 220 of the backing plates 180 and 182.

Tension springs 222 and 224 tend to hold the toggle elements 202 and 206 on the left and 204 and 208 on the right in down position and in such condition the end pressure plates 172 and 174 will be drawn away from the plunger 34. When cams 186 and 188 rotate to drive rods 198 and 200 upwardly then the toggle will be straightened and the end pressure plates will be forced firmly against the ends of the plunger 34 which at that time will be in maximum down position as shown in Fig. 12. When in the position shown in Figs. 18 and 19 the end pressure plates will be exerting a maximum force against the box ends 14 and 16 and simultaneously pressure will be brought to bear against small separate end plates 46 and 48 (see Fig. 18) which plates carry the folder points 164 and 166. These separate plates act to bring pressure to bear against the ends 26 and 28 of lid 10 and the tabs 30 and 32.

The end pressure plates 46 and 48, as shown in Figs. 13 and 17, are pivoted at 226 and 228 and are normally held in outward position by the springs 229 and 231. In this way they are maintained in expanded position until the backing plates 180 and 182 are actuated by the toggle mechanisms as explained heretofore. The end pressures against all of the end elements of the box are applied simultaneously so that all six points are secured at the same time, thus completing the box assembly.

In order that the ends of the box may be properly squared up at the time the end pressure plates come into play, there are provided two horizontally extending shelflike elements referred to as trap doors and numbered 230 and 232 in Figs. 18 and 19. When the plunger 34 reaches its downmost position the two ends of the box will bear on the trap doors 230 and 232, the folders 38 and 40 will be bearing against the front and back of the box and the folder 44 will be bearing against the flap 12. In addition, the pressers 46 and 48 have at their lower portions short horizontal shelf-like elements 234, shown in Figs. 7 to 15, against which the under side of the ends of the lid 10 are brought to bear when the plunger 34 reaches the bottom of its stroke. As all of these elements are rectangularly related to each other, the box will be glued together in a squared-up condition.

*Removal of box from machine*

After the box has reached the assembled position shown in Fig. 12 in which the various sides, top, bottom and ends are folded around the plunger 34 with the glued ends under pressure, the various cams then move on to produce the following results. The rod 68 moves to start plunger 34 upwardly. Cams 98 and 124 cause the folder 40 to move to the left and somewhat downwardly from the position shown in Fig. 12 to that shown in Fig. 15. The folders 38 and 44 simultaneously separate to take the pressure from the box front 4 and flap 12 and at the same time the end pressure plates move outwardly to relieve the end pressure. The result of the relieving of all pressure against the box while it is still positioned around plunger 34 would normally result in the box being carried upwardly with the plunger's upward movement were it not for the shedders 50, 52, 54 and 56, previously referred to. The shedders 50 and 52 which are in the nature of hook-like elements, facing downwardly, extend into the vertical grooves 78 and 80 at the rear of plunger 34. Thus, as the plunger moves upwardly the shedders 50 and 52 hold the top of the box from upward movement. At the same time, the shedders 54 and 56 which extend outwardly a limited distance from the faces of the end pressure plates 172 and 174 engage the top edge of the box ends 14 and 16. These shedder points are likewise designed to overlie the box ends and extend a short distance into the vertical grooves 76 that are in the two ends of plunger 34.

The effect of shedders 50, 52, 54 and 56 is to hold the box against upward movement as plunger 34 goes up, thus automatically freeing the finished box from the plunger. As soon as the box is free of the plunger it falls by gravity downwardly through the open space now available since the folder 40 has moved to its maximum left hand position, as shown in Fig. 15. As the box falls, it engages the deflector 58 which causes it to be deposited on the conveyor belt 60 which carries it out of the machine to a collection point.

*Summary of operation*

The steps in the assembly of the six point set-up box will now be summarized by reference to Figs. 7 to 15. The blank 2 is fed in from the left, arriving in the position of Fig. 7 with glue applied to the upper surfaces of the ends 14, 16, 26 and 28. The folders 38, 40 and 44 are in open position and the end pressure plates 172 and 174 are likewise withdrawn as the plunger 34 descends. The plunger bottom engages the bottom 6 of the blank, driving it downwardly and causing the front 4 and the back 8 to engage against the top of folders 38 and 40 which are still spread apart to cause easy commencement of the folding of the front and back upwardly as shown in Fig. 8. At the same time, the flaps 18, 20, 22 and 24 are engaged by the respective folder points 160, 162, 164 and 166 causing the said flaps to be folded inwardly ahead of the folding of the ends 14 and 16 which is occurring simultaneously as shown in Fig. 10.

Further downward movement of plunger 34 occurs and simultaneously folders 38 and 40 move inwardly to press front 4 and back 8 firmly against the vertical sides of the plunger. As this occurs, the lid 10 will hit the under side of extension 42 of the plunger so that it will assume a substantially horizontal position as shown in Fig. 9.

Downward movement of plunger 34 then continues driving the box downwardly between folders 38 and 40 until the upper edge of folder 40 drives up into engagement with the under side of extension 42 as shown in Fig. 11, thereby squaring the lid 10 against the under side of extension 42. While this latter phase was occurring, the flap 12 had come into engagement with the top of folder 44 causing the flap to bend upwardly as in Fig. 11, while the folder 44 was still spaced from the left hand side of extension 42. Also, during this stage the tabs 30 and 32 have been engaged by folder points 168 and 170 to be folded inside of the lid ends 20 and 26, which lid ends are brought to folded position by the plates 46 and 48 as shown in Fig. 13.

Further downward movement of plunger 34 follows with the front 4 sliding downwardly with respect to folder 38 and the flap 12 sliding downwardly with respect to folder 44. The folder 40, however, is forced downwardly by plunger 34 and does not shift its position with respect to the back 8. However, as previously explained, the construction permits folder 40 to move in this manner as it slides on the vertical rods 118 and compresses the springs 122. When in maximum down position, the plunger will have carried the box to a point where the shedders 50, 52, 54 and 56 are all above the top edges of the box so that when upward movement of the plunger occurs the box will be stripped therefrom.

When the plunger has left its maximum down position and starts upwardly the folders 38, 40 and 44 and the end pressure plates 172 and 174 relax their pressures against the box so that the shedders are able to strip the box from the upwardly moving plunger. The box then falls to the conveyor and is removed. As soon as the plunger has risen to a height to clear the path of the oncoming next blank, the conveyor mechanism of conventional design brings a new blank 2 to the position shown in Fig. 7, and the operation is then repeated. It will be understood by persons familiar with this art that the timing of the various cams to cause timed movement of the folders and end pressure plates with respect to the downward movement of the plunger 34 is an operation within the skill of mechanics who are familiar with these machines and therefore detailed settings of the cams are not given except to show their general relationship at selected stages in the operation.

*Modification of the invention*

A modification of the invention is shown in Figs. 20 to 30 inclusive. In these figures, there is shown a box blank differing somewhat from the blank shown in Fig. 1 and which is known in the trade as a cereal type box. This box is a six point box, however, in that there are six gluing points and the steps involved in folding the box are substantially the same as those utilized in folding the blank of Fig. 1. The difference between the blank of Fig. 1 and that of Fig. 20, apart from the dimension differences, is that in Fig. 20 the outer ends of the box are attached to the back rather than to the bottom and the two tabs which are positioned interior of the ends and secured thereto by gluing, or otherwise, are attached to the front and bottom of the box.

Because of this difference in the blank construction, it is necessary to have the machine arranged to fold the tabs of the front and bottom inwardly somewhat ahead of the folding in of the ends so that, as the blank approaches completed form, the tabs will be in their proper position inside of the ends. If the folding procedures previously described with respect to Fig. 1 were used, the ends of Fig. 20 would find themselves inside of those tabs that are attached to the bottom which, of course, would be an improper way of folding the blank of Fig. 20.

For purposes of reference in the description of the modified form of the invention that follows, the box blank of Fig. 20 is referred to generally as 300. The blank includes a front 302, bottom 304, back 306, lid 308, lid flap 310, tabs 312 and 314 extending from the ends of front 302, tabs 316 and 318 extending from the ends of bottom 304, ends 320 and 322 extending from back 306, lid ends 324 and 326 extending from lid 308, and lid end tabs 328 and 330 extending from flap 310.

It will be noted that the adjacent corners of tabs 312 and 316 and 314 and 318 are cut at 45° to make an included angle of 90°, thereby making it possible for the tabs, when folded as in Fig. 22, to abut rather than overlap. If found more convenient, however, the 90° included angle between the tabs may be reduced or eliminated, in which case the tabs when folded in the completed box will overlap. This is a matter of choice and does not affect the invention either as to the method or the machine. Boxes utilizing the cereal type of blank may be of any selected dimensions although in the form shown in Figs. 20 to 24 the box is relatively deep and narrow instead of being shallow and long as in Figs. 1 to 5.

The machine utilized in carrying out the folding operations that produce the box shown in Figs. 20 to 24 is shown in Figs. 25 to 30. These figures show a series of successive positions of the machine and the box blank as it is being folded. The elements of the machine are substantially the same as those shown in Figs. 6 to 19, and, where the parts are the same or substantially the same, identical numbers have been applied in Figs. 25 to 30.

With the foregoing in mind, it will be seen in Fig. 25 that the blank 300 has been introduced in the machine to its first position under plunger 34. The blank in this case has been moved to position from right to left so that the leading edge of the blank, as it moves from the gluing points to the position shown, is the long edge of the lid flap 310. However, the directional feed of the blank is a matter of choice so long as the blank is finally brought to rest properly positioned under the plunger. The blank reaching this position slides on spaced tracks 332 that are located outside of the pressure plates 334. The pressure plate on each side is an integral unit as distinguished from the two separate pressure plates 46 and 172, referred to in connection with the disclosure above. The reason why a single pressure plate 334 may be utilized instead of two will appear hereinafter.

Blank 300 stops so that the bottom 304 is located directly under plunger 34. The tabs 312, 316, 314 and 318 extend laterally over the upper edges of pressure plates 334. The front folder 38 has on either end long folder points 336, long enough to overlie tabs 312 and 316 on one side and 314 and 318 on the other. Folder points 68 on opposite ends of the lid flap folder are the same as those previously described and are positioned so as to fold the tabs 328 and 330 inwardly of lid ends 324 and 326 when the proper time is reached.

The back folder 40 is of the same construction as that heretofore explained but there are no folder points that accompany the horizontal movement of back folder 40. That is to say, the folder points 164 and 166, shown in Figs. 7 to 19, and the horizontally moving slides to which they are attached are eliminated in the construction shown in Figs. 25 to 30.

*The folding operation of the blank shown in Fig. 20*

Figure 26:
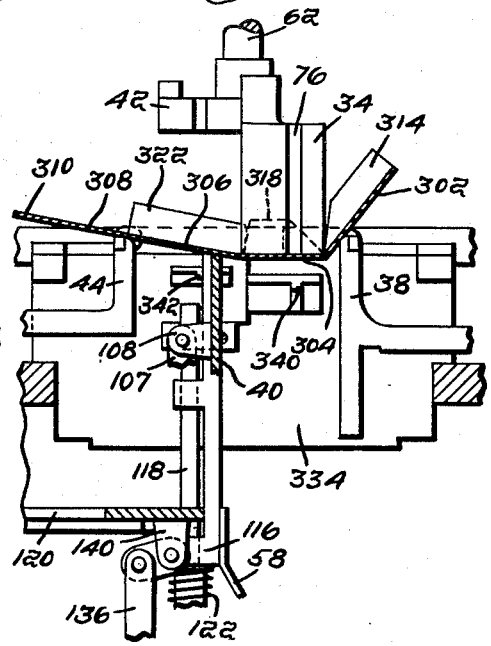

With blank 300 in position as in Fig. 25, the plunger 34 commences its downward movement. The bottom of the plunger engages blank bottom 304, pressing it downwardly, as shown in Fig. 26. As this occurs, the front 302 engages the top of front folder 38 and the back 306 engages the top of back folder 40, causing bending to take place, as indicated. At the same time, the tabs 314 and 318 are engaged by the upper edge of folder point 336, causing them to be bent upwardly in the manner indicated. When reference is made to tabs 314 and 318, it will be understood that similar folding is occurring with respect to tabs 312 and 316 which are being engaged by a folding point similar to 336 on the near side of the box, as viewed in Fig. 26. The box as shown in this and subsequent figures is in section so that only the tabs 314 and 318, end 322, lid end 326 and tab 330 can be shown.

As the blank starts its descent, as shown in Fig. 26, the end 322 is engaged by the upper edge 338 of pressure plate 334 and commences to bend upwardly. But this upward bending follows behind the bending of tabs 314 and 318 so that the end 322 will be outside of the tabs when the folding of the body is completed, as illustrated in Fig. 22.

Figure 27:
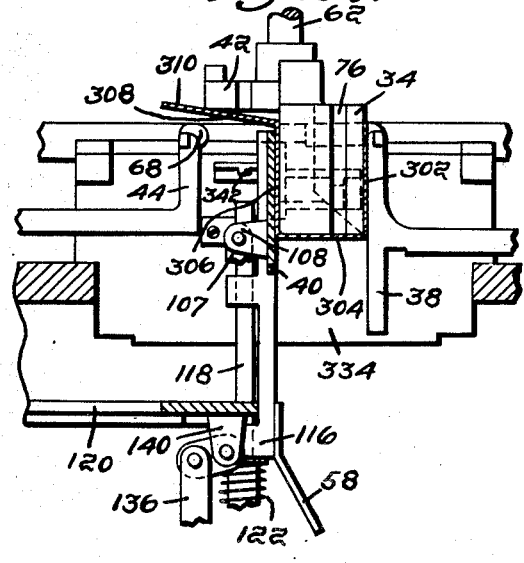
Figure 28:
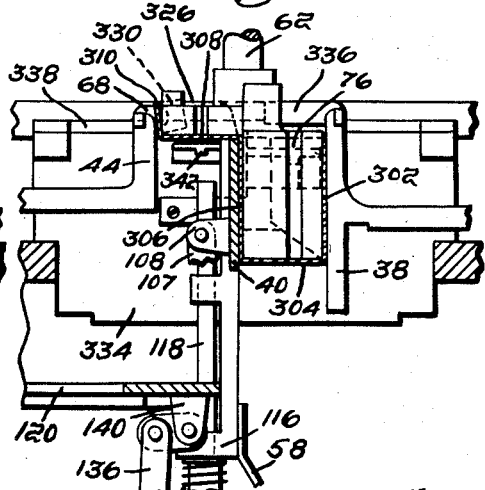

Fig. 27 shows the position of the parts after the front 302 and back 306 have been bent to vertical position and pressed against the opposed faces of plunger 34 by inward movement of front folder 38 and back folder 40. This pressure, while enough to form the box, purposely does not prevent further downward movement of plunger 34 which continues, as illustrated in Fig. 28, to cause the front 302 to slide downwardly along the face of front folder 38 and to drive the back folder 40 downwardly when the top edge thereof has come into engagement with the underside of top 308, thus accurately folding the top 308 with respect to the back 306. While this is occurring, the lid flap 310 has come into engagement with the top edge of lid flap folder 44 causing it to be bent upwardly, as shown, and, at the same time, folder point 68 has started the inward folding of tab 330 so that the tab will be inside of lid end 326 which is caused to bend upwardly as it moves downwardly and engages the top edge 338 of pressure plate 334. The folding of lid end 324 and tab 328 is occurring simultaneously on the other end of the lid.

The downward movement of plunger 34 continues for an additional distance, as shown in Fig. 29, with the front 302 and the lid flap 310 sliding downwardly along the faces of folders 38 and 44. Folder 40 which is movable vertically by virtue of its vertical sliding relation on rods 118, moves downwardly with the box in the position shown. At the end of the downward stroke of plunger 34, the opposed shedders 340, one on each pressure plate, will then be above the top edge of the end of the box and the opposed shedders 342, one on each pressure plate, will be above the top edge of the lid end. With the box in this position, the pressure plates 334 are then moved inwardly to press against the ends of the box utilizing the toggle mechanism, previously described, to apply the pressure so that the glued areas, indicated by stippling in Figs. 20, 21 and 22, may make firm contact with and be secured to the parts that overlap the glued areas.

The pressure plates 34 are then withdrawn slightly to relieve the end pressure against the box and, at the same time, folders 38, 40 and 44 back away from the surfaces of the box with which they have been in engagement so that as the plunger commences its upward movement, the completed box may be stripped from the plunger by the shedders 340 and 342 and when free of the plunger, may commence to fall as shown in Fig. 30 to a collection point below. It will be noted that the lid 308, as shown in Fig. 30, is not at right angles to the back 306. This is due to the fact that the inherent resiliency of the blank at the fold line between the lid and the back is such that when the box is freed of plunger 34, the lid tends to straighten out, as shown. This diminishes the possibility of a box remaining hanging by its lid on the upper edge of folder 40.

*Conclusion*

From the foregoing explanation, it is believed apparent that we have invented a new and improved method of forming a six point box and a new machine capable of carrying out the method herein described. The method practiced with respect to the box blank, shown in Fig. 1, is the same as that practiced with respect to the blank shown in Fig. 20. That is to say, the body of the box is completely folded while maintaining the lid portion in a substantially horizontal position. Then the lid is folded and held in horizontal position to be followed by the application of end pressure to cause the glued areas to adhere to the corresponding overlying portions. The box is then stripped from the plunger by the shedders and allowed to fall free to a collecting area.

It is our intention to cover all changes and modifications of the example of the invention herein chosen for purposes of the disclosure which do not constitute departures from the spirit and scope of the invention.

We claim:

1. In a machine for assembling a set-up box having a front, bottom, back, body ends and body tabs, a lid, a lid flap, lid ends and lid tabs, a plunger movable vertically and about which said box is formed, said plunger having a body forming portion comprising a bottom and parallel vertical faces and a lid forming portion comprising a bottom and a vertical face, three folders, the first of said folders movable toward and away from one of said parallel vertical faces of said body forming portion for folding said front, the second of said folders movable toward and away from said vertical face of said lid forming portion for folding said lid flap, and the third of said folders movable toward and away from and downwardly with said other parallel vertical face of said body forming portion for folding said back, each of said folders timed to move toward said faces while said plunger is moving downwardly.

2. In a machine for assembling a set-up box as set forth in claim 1, said lid forming portion having its bottom adjacent the top of one of the parallel vertical faces of the body forming portion.

3. In a machine for assembling a set-up box as set forth in claim 1, the said first and second of said folders movable only in planes at right angles to the direction of movement of said plunger.

4. In a machine for assembling a set-up box as set forth in claim 1, the third of said folders being spring supported vertically and arranged to engage said other parallel vertical face before said plunger has reached the limit of its downward stroke, said third of said folders movable downwardly upon engagement with the bottom of said lid forming portion.

5. In a machine for assembling a set-up box as set forth in claim 1, said first and third folders timed to engage said parallel vertical faces of said body forming portion prior to the engagement of said second of said folders with the said vertical face of said lid forming portion.

6. In a machine for assembling a set-up box as set forth in claim 1, and horizontally movable members positioned to first fold and then to press the ends of said box against the ends of said plunger when said plunger is in downmost position, said members movable away from said plunger to clear the ends of said box while said plunger is moving upwardly.

7. In a machine for assembling a set-up box as set forth in claim 1 and means for engaging and folding said ends upwardly as said plunger moves downwardly and means for engaging the upper edges of the folded body and lid of the box formed by said machine while said plunger is moving upwardly thereby to free said box from said plunger.

8. In a machine for assembling a set-up box as set forth in claim 1, said third of said folders being actuated by two cams, one cam causing horizontal movement of said third folder toward and away from one of said parallel vertical faces and the other cam causing vertical movement.

9. In a machine for assembling a set-up box as set forth in claim 1, pressers located at opposite ends of said plunger when said plunger is in its downmost position, means for forcing said pressers against the ends of said body forming portion and the ends of said lid forming portion while said plunger is at the bottom of its stroke for pressing said body ends against the tabs on the ends of said front and back and for pressing the lid ends against the tabs on the ends of said lid flap.

10. In a machine for assembling a set-up box having a front, bottom, back, body ends, body tabs, a lid, lid ends, a lid flap and lid tabs, a plunger movable vertically and about which said box is formed, said plunger having a body forming portion comprising a bottom and parallel vertical faces and a lid forming portion comprising a bottom and a vertical face, three folders, the first of said folders movable toward and away from one of said parallel vertical faces for folding said front, the second of said folders movable toward and away from said vertical face of said lid forming portion for folding said lid flap, the third of said folders movable toward and away from and downwardly with said other parallel vertical face for folding said back, each of said folders timed to move toward said faces while said plunger is moving downwardly, folder points fixed with respect to said first and second folders for folding the tabs on the front and lid flap, and pressure plates for engaging and folding said body ends and lid ends while said plunger moves downwardly with respect thereto.

11. In a machine for assembling a set-up box having a front, bottom, back, body ends, body tabs, a lid, lid ends, a lid flap and lid tabs, a plunger movable vertically and about which said box is formed, said plunger having a body forming portion with a bottom and parallel vertical faces and parallel vertical ends and a lid forming portion having a bottom and a vertical face and parallel vertical ends, three folders, the first of said folders movable toward and away from one of said parallel vertical faces, the second of said folders movable toward and away from the said vertical face of said lid forming portion, the third of said folders movable toward and away from and downwardly with said other parallel vertical face, each of said folders timed to move toward said faces while said plunger is moving downward, and pressers positioned at the ends of said plunger, said pressers movable toward said plunger ends when said plunger is at the bottom of its stroke to press said ends and tabs against the ends of said plunger body forming portion and the ends of said plunger lid forming portion.

12. In a machine for assembling a set-up box as set forth in claim 11 and folder points for folding said tabs inside said ends as said plunger descends.

13. In a machine for assembling a set-up box as set forth in claim 11, folder points fixed with respect to said first and second folders for engaging and folding the flaps extending from said front and lid flap and an independent pair of folder points movable in a horizontal plane only along with the horizontal component of the movement of said third folder for engaging and folding the flaps on the ends of said back.

14. In a machine for assembling a set-up box from a box blank comprising a front, back and a lid flap, a plunger movable vertically and about which said box is formed, said plunger having a bottom, two vertical side faces and two vertical end faces for forming the box body and another bottom and vertical side face and two vertical end faces for forming the lid, a plurality of folders movable horizontally during the descent of said plunger to force the front, back and lid flap of said blank against the vertical side faces of said plunger, one of said folders movable downwardly with said plunger during the latter part of the plunger's downward stroke.

15. In a machine for assembling a set-up box from a box blank as set forth in claim 14, two pairs of pressers for exerting pressure toward the ends of said plunger when said plunger is at the bottom of its stroke, one pair of said pressers being immovable in a direction parallel to the ends of said plunger and the other pair of said pressers being movable in a horizontal direction parallel to the ends of said plunger and means for forcing both of said pairs of pressers towards the ends of said plunger when said plunger is in substantially downmost position.

16. In a machine for assembling a set-up box from a box blank comprising a front, back and lid flap, a plunger movable vertically and about which said box is formed, said plunger having two vertical side faces and end faces at one level and another vertical side and end faces at another level, a plurality of folders movable horizontally during the descent of said plunger to force the said front and back against the said two vertical side faces and to force the said lid flap against the other vertical side face of said plunger, one of said folders movable downwardly with said plunger during the latter part of the plunger's downward stroke, and pressers for exerting pressure towards the said vertical end faces when said plunger is at or close to the bottom of its stroke.

17. In a machine for assembling a set-up box from a box blank, a plunger movable vertically and about which said box is formed, three folders movable with their faces at all times vertical, toward said plunger during said plunger's descent and one of said folders also movable downwardly with said plunger after completion of its movement towards said plunger and pressers for exerting pressure toward the ends of said plunger when said plunger is at or close to the bottom of its stroke.

18. In a machine for assembling a set-up box from a box blank, a plunger movable vertically and about which said box is formed, three folders movable toward said plunger during said plunger's descent and two pairs of pressers for exerting pressure toward the ends of said plunger when said plunger is at or close to the bottom of its stroke, one pair of said pressers being immovable in a direction parallel to the ends of said plunger and the other pair of said pressers being movable in a horizontal direction parallel to the ends of said plunger and means for forcing both of said pairs of pressers towards the ends of said plunger when said plunger is in substantially downmost position.

19. In a machine for assembling a set-up box having a front, bottom, back, body ends extending from said bottom, tabs on the ends of said front and back, a lid, lid ends, a lid flap, and lid tabs on the ends of said lid flap, a plunger movable vertically and about which said box is formed, said plunger having a body forming portion comprising a bottom and parallel vertical faces and a lid forming portion comprising a bottom and a vertical face, three folders, the first of said folders movable toward and away from one of said parallel vertical faces for folding said front, the second of said folders movable toward and away from said vertical face of said lid forming portion for folding said lid flap, and the third of said folders movable toward and away from and downwardly with said other parallel vertical face for folding said back, each of said folders timed to move toward said faces while said plunger is moving downwardly.

20. In a machine for assembling a set-up box having a front, bottom, back, body ends extending from said bottom, tabs on the ends of said front and back, a lid, lid ends, a lid flap and tabs on the ends of said lid flap, a plunger movable vertically and about which said box is formed, said plunger having a body forming portion comprising a bottom and parallel vertical faces and a lid forming portion comprising a bottom and a vertical face, three folders, the first of said folders movable toward and away from one of said parallel vertical faces for folding said front, the second of said folders movable toward and away from said vertical face of said lid forming portion for folding said lid flap, the third of said folders movable toward and away from and downwardly with said other parallel vertical face for folding said back, each of said folders timed to move toward said faces while said plunger is moving downwardly, folder points fixed with respect to said first and second folders for folding the tabs on the front and lid flap, and folder points separate from said third folder for folding the tabs on said back, while said plunger moves downwardly with respect thereto.

References Cited in the file of this patent

UNITED STATES PATENTS

| Number | Name | Date |
|---|---|---|
| 1,886,055 | Schmiedel | Nov. 1, 1932 |
| 1,888,808 | Schmiedel | Nov. 22, 1932 |
| 2,154,950 | Macdonald | Apr. 18, 1939 |
| 2,469,641 | Goss | May 10, 1949 |
| 2,581,491 | Linstedt | Jan. 8, 1952 |